United States Patent
Costantino et al.

(10) Patent No.: US 12,406,506 B2
(45) Date of Patent: *Sep. 2, 2025

(54) ARTICULATED OBJECT DETERMINATION

(71) Applicant: Zoox, Inc., Foster City, CA (US)

(72) Inventors: Adrian Michael Costantino, Foster City, CA (US); Subhasis Das, San Mateo, CA (US); Francesco Papi, Oakland, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,548

(22) Filed: Apr. 30, 2024

(65) Prior Publication Data

US 2024/0282115 A1    Aug. 22, 2024

Related U.S. Application Data

(63) Continuation of application No. 17/491,301, filed on Sep. 30, 2021, now Pat. No. 12,039,784.

(51) Int. Cl.
*G06V 20/56* (2022.01)
*G06V 20/17* (2022.01)
(Continued)

(52) U.S. Cl.
CPC .............. *G06V 20/56* (2022.01); *G06V 20/17* (2022.01); *G06V 20/58* (2022.01); *G06V 20/64* (2022.01)

(58) Field of Classification Search
CPC ........ G06V 20/56; G06V 20/17; G06V 20/58; G06V 20/64
See application file for complete search history.

(56) References Cited

U.S. PATENT DOCUMENTS 11,113,873 B1 * 9/2021 Bosse ...................... G06T 7/10
2016/0332516 A1   11/2016 Kuehnle
(Continued)

FOREIGN PATENT DOCUMENTS

WO    WO-2016168650 A1 * 10/2016 ............ B60W 30/06
WO    WO-2020207572 A1 * 10/2020 ............ B60T 8/1708

OTHER PUBLICATIONS

Katz, Dov, Andreas Orthey, and Oliver Brock. "Interactive perception of articulated objects." In Experimental Robotics: The 12th International Symposium on Experimental Robotics, pp. 301-315. Springer Berlin Heidelberg, 2014. (Year: 2014).*

(Continued)

*Primary Examiner* — Carol W Chan
(74) *Attorney, Agent, or Firm* — Lee & Hayes, P.C.

(57) ABSTRACT

A vehicle computing system may implement techniques to determine whether two objects in an environment are related as an articulated object. The techniques may include applying heuristics and algorithms to object representations (e.g., bounding boxes) to determine whether two objects are related as a single object with two portions that articulate relative to each other. The techniques may include predicting future states of the articulated object in the environment. One or more model(s) may be used to determine presence of the articulated object and/or predict motion of the articulated object in the future. Based on the presence and/or motion of the articulated object, the vehicle computing system may control operation of the vehicle.

20 Claims, 6 Drawing Sheets

(51) Int. Cl.
  *G06V 20/58* (2022.01)
  *G06V 20/64* (2022.01)

(56) References Cited

U.S. PATENT DOCUMENTS

| | | | |
|---|---|---|---|
| 2017/0242443 A1* | 8/2017 | Schuh | G08G 1/163 |
| 2018/0325013 A1 | 11/2018 | Boydens | |
| 2019/0025841 A1 | 1/2019 | Haynes et al. | |
| 2019/0164333 A1* | 5/2019 | Fukushima | G06T 3/00 |
| 2019/0367021 A1* | 12/2019 | Zhao | G08G 1/161 |
| 2020/0247200 A1 | 8/2020 | Ferrer et al. | |
| 2021/0080558 A1 | 3/2021 | Gosala et al. | |
| 2021/0170947 A1 | 6/2021 | Yunus | |
| 2021/0380099 A1 | 12/2021 | Lee et al. | |
| 2022/0161782 A1 | 5/2022 | Laine | |
| 2022/0299626 A1 | 9/2022 | Chen et al. | |

OTHER PUBLICATIONS

Office Action for U.S. Appl. No. 17/491,318, mailed on Jul. 14, 2023, Adrian Michael Costantino, "Predicting Articulated Object States", 24 pages.

Van der Merwe, et al., "The Square-Root Unscented Kalman Filter for State and ParameteEstmation" Oregon Graduate Institute of Science and Technology, Feb. 2000, 4 pages.

Wan, et al., "The Unscented Kalman Filter for Ninlinear Estimation" Oregon Graduate Institute of Science & Technology, Oct. 2000, 6 pages.

Zhou, et al., A New Adaptive Square-Root Unscented Kalman Filter for Nonlinear Systems with Additive Noise, Hindawi Publishing Corporation, Feb. 27, 2015, 10 pages.

Office Action for U.S. Appl. No. 17/491,301, mailed on Jan. 25, 2024, Adrian Michael Costantino, 11 pages.

* cited by examiner

ARTICULATED OBJECT DETERMINATION

RELATED APPLICATIONS

This application is a continuation of and claims priority to U.S. patent application Ser. No. 17/491,301, filed Sep. 30, 2021, titled, "ARTICULATED OBJECT DETERMINATION," the entirety which is incorporated herein by reference.

BACKGROUND

Planning systems in autonomous and semi-autonomous vehicles determine actions for a vehicle to take in an operating environment. Actions for a vehicle may be determined based in part on avoiding objects present in the environment. In some examples, a planning system may generate a representation of an object, e.g., a bounding box, to represent the object's position, orientation, and/or extents, and may be used to predict movement of the object. In a two-dimensional space, a bounding box may be a rectangle or other polygon. In a three-dimensional space, a bounding box may be a three-dimensional object, e.g., a cuboid defined by eight corners.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
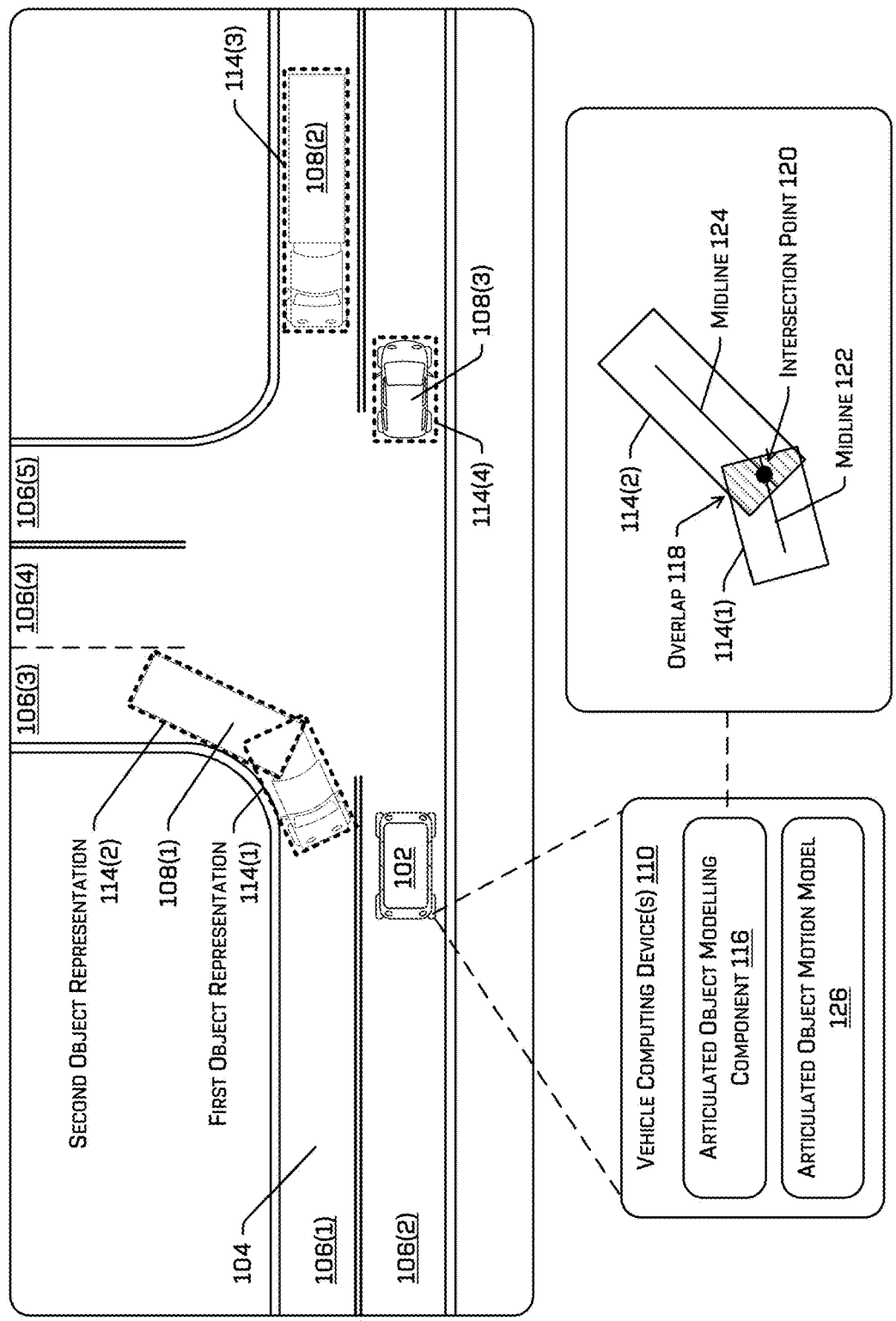
FIG. 1 is an illustration of an example environment in which one or more models determine presence of an articulated object.

This application describes techniques for applying a model to join two or more detected objects in an environment as an articulated object. For instance, one or more models may process data associated with objects in the environment to identify, classify, or otherwise determine two or more objects (e.g., a tractor and a trailer, a vehicle and a boat, a truck and a camper, and so on) as an articulated object (e.g., an object with joined portions that can articulate relative to each other). The model(s) may, for example, apply one or more heuristics and/or algorithms to sensor data received from one or more sensors to associate, join, or otherwise relate two objects as an articulated object in the environment. Articulated object(s) determined by the model(s) may be considered during vehicle planning thereby improving vehicle safety as a vehicle navigates in the environment by planning for the possibility to encounter articulated object(s) (e.g., tracking multiple portions of the articulated object).

In some examples, a computing device can implement the model(s) to predict whether to join two objects in an environment based on one or more heuristics and/or algorithms that identify a relationship between the objects. For instance, an autonomous vehicle may comprise a vehicle computing device to detect objects using one or more sensors while navigating in the environment. The objects may include static objects (e.g., buildings, bridges, signs, etc.) and dynamic objects such as other vehicles (e.g., cars, trucks, motorcycles, mopeds, trailers, etc.), pedestrians, bicyclists, or the like. In some examples, the objects may be detected based on sensor data from the one or more sensors (e.g., cameras, motion detectors, LIDAR sensors, RADAR sensors, etc.) associated with the vehicle. Sensor data representing the detected objects may be input into the model(s), which classify objects as articulated objects and/or track the articulated objects (e.g., predict one or more predicted trajectories, locations, speeds, poses, and so on) in the future.

Techniques described herein can include processing the sensor data to determine data indicative of a top-down representation of an environment and objects in the environment. The data can comprise rasterized image data or vectorized data that represent the environment and the objects. In some examples, the top-down representation of the environment can represent an object by a bounding box (e.g., a two-dimensional representation of a pedestrian, a bicyclist, another vehicle, a tractor trailer, and the like). In one specific example, a tractor object and a trailer object may be depicted as respective rectangular bounding boxes that substantially encompass the length and width of the respective object (e.g., approximate (and encompass) the extents of a footprint of the object(s)). In such examples, a model implemented by the computing device may receive data that includes a first object representation of a tractor having an engine and a second object representation of a trailer (and in some cases additional trailer(s) that follow). In such examples, the techniques described herein can determine to join the first object representation and the second object representation (e.g., to join the tractor and the trailer as a single object) based on a size, an intersection, and/or an overlap of the object representations. For instance, models according to this disclosure may apply a physical heuristic, a physics algorithm, and/or other mathematical algorithm (e.g., linear algebra) to determine a likelihood that a detected object or detected objects is/are articulated objects. Without limitation, the model(s) may determine an articulated object when a detected object representation is larger than a threshold size and/or that multiple object representations overlap. Additional details for joining objects as an articulated object are discussed throughout this disclosure, including with reference to FIGS. 1 and 2.

Aspects of this disclosure also may include inputting an indication of an articulated object into one or more additional models configured to predict future states of the articulated object (e.g., a position, a velocity, and the like) as the articulated object moves in the environment in the future. For instance, the computing device can use an indication of the articulated object during planning operations to control the vehicle such as to determine a vehicle trajectory relative to the articulated object.

Techniques described herein can include a computing device implementing a model to determine a first size of the first object representation and a second size of the second object representation, and to compare the first size or the second size to a size threshold. For instance, a length, a width, and/or an area of an object representation that meets or exceeds the threshold size can be joinable with a nearby or overlapping object representation to define an articulated object. In some examples, only one of the two sizes of the object representations need to meet or exceed the threshold size to join two objects (e.g., a representation of the trailer includes a length of 11 meters which is over an example threshold of 10 meters). In other examples, a combined size of both object representations can be compared to the size threshold for determining whether join objects as an articulated object.

The model may also, or instead, identify, classify, or otherwise determine an articulated object based at least in part on a distance between two points associated with each respective object. In such examples, the model may compare the distance between points associated with the object representations to a distance threshold, and join objects having a distance less than the distance threshold. For instance, a distance between a point associated with a midline, a center, and/or a boundary of one object representation, such as a truck, and another point associated with a midline, a center, and/or a boundary of another object representation, such as a trailer, may be compared to a distance threshold for determining presence of an articulated object (e.g., the distance between the boundaries of two object representations can be considered joined in the environment when the distance is equal to or less than a 1 meter distance threshold).

In various examples, the model can classify an articulated object based on detecting that two or more object representations overlap and/or intersect. For instance, a first representation may have a point (e.g., a midline point, a center point, an edge point) that overlaps with a corresponding point of a second representation. In various examples, a first representation may have a midline that intersects with another midline of the second representation. The model can output a classification that the two objects represent an articulated object (e.g., a single object with multiple portions that are movable relative to each other) based at least in part on detecting that the object representations overlap and/or intersect.

Systems described herein can also include a computing device implementing a model to join a first representation of a first object (e.g., a vehicle bounding box) and a second representation of a second object (e.g., a boat bounding box) as the articulated object based at least in part on a control policy. For instance, the computing device can identify behaviors of the first object and the second object over time (based on sensor data, map data, and so on), and apply a control policy, such as a right of way or a rule at an intersection to join the first object and the second object in the environment. By way of example and not limitation, the model can identify, detect, or otherwise determine that two object representations proceed substantially simultaneously from a stop sign, a green light, and so on.

The model can, in some examples, join the first and second objects based on comparing object types (e.g., tractor, trailer, car, pedestrian, cyclist, animal, building, tree, road surface, curb, sidewalk, boat, camper, unknown, etc.) associated with each object. For instance, the model may join objects that are classified as a tractor and a trailer, a vehicle and a boat, a vehicle and a trailer, a truck and a camper, and the like based at least in part on similarity between the object types. In contrast, if the two objects are both classified as passenger cars, the model would not classify the two objects as an articulated object, even when following each other closely, such as in heavy traffic. Thus, by considering a size of an object (or representation thereof), a distance to another object, an intersection between objects, an overlap between objects, and/or an object type, the model can improve determinations of articulated objects.

In various examples, a vehicle computing device may receive one or more instructions representative of output(s) from one or more models. The vehicle computing device may, for instance, send an instruction from the one or more models to a planning component of the vehicle that plans a trajectory for the vehicle and/or to a perception component of the vehicle that processes sensor data. Additionally or alternatively, output(s) from one or more models may be used by one or more computing devices remote from the vehicle computing device for training a machine learned model (e.g., to classify objects as an articulated object).

In various examples, the vehicle computing device may be configured to determine actions to take while operating (e.g., trajectories to use to control the vehicle) based on one or more models determining presence and/or movement of articulated object(s). The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, a group of pedestrians, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

As described herein, models may be representative of machine learned models, statistical models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein may improve a functioning of a vehicle computing system in a number of ways. The vehicle computing system may determine an action for the autonomous vehicle to take based on an articulated object represented by data. In some examples, using the articulated object tracking techniques described herein, a model may predict articulated object trajectories and associated probabilities that improve safe operation of the vehicle by accurately characterizing motion of the articulated object with greater detail as compared to previous models.

The techniques discussed herein can also leverage sensor data and perception data to enable a vehicle, such as an autonomous vehicle, to navigate through an environment while circumventing objects in the environment. In some cases, evaluating an output by a model(s) may allow an autonomous vehicle to generate more accurate and/or safer trajectories for the autonomous vehicle to traverse an environment. Techniques described herein can utilize information sensed about the objects in the environment to more accurately determine current states and future estimated states of the objects. For example, techniques described herein may be faster and/or more robust than conventional techniques, as they may increase the reliability of representations of sensor data, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination without reacting to incorrect object representations. These and other improvements to the functioning of the computing device are discussed herein.

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. For example, any sensor-based and/or mapping system in which objects are identified and represented may benefit from the techniques described. By way of non-limiting example, techniques described herein may be used on aircrafts, e.g., to generate representations of objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that maps objects.

FIGS. 1-6 provide additional details associated with the techniques described herein.

FIG. 1 is an illustration of an example environment 100 in which one or more models determine presence of an articulated object. In the illustrated example, a vehicle 102 is driving on a road 104 in the environment 100, although in other examples the vehicle 102 may be stationary and/or parked in the environment 100. In the example, the road 104 includes a first driving lane 106(1), a second driving lane 106(2), a third driving lane 106(3), a fourth driving lane 106(4), and a fifth driving lane 106(5) (collectively, the driving lanes 106) meeting at an intersection or junction. The road 104 is for example only; techniques described herein may be applicable to other lane configurations and/or other types of driving surfaces, e.g., parking lots, private roads, driveways, or the like.

The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

In the scenario illustrated in FIG. 1, a number of additional vehicles also are traveling on the road 104. Specifically, the environment 100 includes a first additional vehicle 108(1), a second additional vehicle 108(2), and a third additional vehicle 108(3) (collectively, the additional vehicles 108). Although FIG. 1 illustrates only the additional vehicles 108 as entities traveling on the road 104, many other types of entities, including, but not limited to, buses, bicyclists, pedestrians, motorcyclists, animals, or the like may also or alternatively be traveling on the road 104 and/or otherwise present in the environment 100.

The vehicle 102 can collect data as it travels through the environment 100. For example, the vehicle 102 can include one or more sensor systems, which can be, for example, one or more LIDAR sensors, RADAR sensors, SONAR sensors, time-of-flight sensors, image sensors, audio sensors, infrared sensors, location sensors, etc., or any combination thereof. The sensor system(s) may be disposed to capture sensor data associated with the environment. For example, the sensor data may be processed by one or more vehicle computing devices 110 or other processing system to identify and/or classify data associated with objects in the environment 100, such as the additional vehicles 108. In addition to identifying and/or classifying the data associated with the additional vehicles 108, the vehicle computing device(s) 110 may also identify and/or classify additional objects, e.g., trees, vehicles, pedestrians, buildings, road surfaces, signage, barriers, road markings, or the like. In specific implementations of this disclosure, the sensor data may be processed by the vehicle computing device(s) 110 to identify portions of the data that are associated with an articulated object, such as an articulated vehicle.

The vehicle computing device(s) 110 may include a planning component (e.g., the planning component 426), which may generally be configured to generate a drive path and/or one or more trajectories along which the vehicle 102 is to navigate in the environment 100, e.g., relative to the additional vehicles 108 and/or other objects. In some examples, the planning component and/or some other portion of the vehicle computing device(s) 110 may generate representations of objects in the environment, including the additional vehicles 108. For instance, FIG. 1 illustrates a first object representation 114(1) and a second object representation 114(2) associated with the first additional vehicle 108(1), a third object representation 114(3) associated with the second additional vehicle 108(2), and a fourth object representation 114(4) associated with the third additional vehicle 108(3) (collectively, the first object representation 114(1), the second object representation 114(2), the third object representation 114(3), and the fourth object representation 114(4) may be referred to as the representations 114). In examples, the representations 114 may be two-dimensional polygons that approximate the extents of the respective additional vehicles 108 (or portions thereof). In the top-down illustration of FIG. 1, each of the representations 114 is a rectangle, though other shapes are possible. In at least some examples, each of the representations 114 may be a rectangular bounding box.

In some examples, the additional vehicles 108 may be represented as a single two-dimensional geometric structure, like the object representations 114(3) and 114(4). In many instances, such representations 114 are sufficient to model the respective object. In the illustrated embodiment the tractor and trailer portions of the second additional vehicle 108(2) are generally aligned, e.g., because the second additional vehicle 108(2) is traveling generally straight in the first lane 106(1). In other examples, the third representation 114(3), may adequately represent the additional vehicle 108(2), e.g., because, even when the first additional vehicle 108(2) moves, the overall extents of the additional vehicle e.g., the overall footprint of vehicle, may vary only slightly. However, generating a single representation or bounding box for each object may be suboptimal if the second additional vehicle 108(2) intends to turn into the fifth lane 106(5), as the second additional vehicle 108(2) navigates that turn, the third object representation 114(3) may be altered such as to include an overinclusive area of the environment 100. In some instances, improper, e.g., overinclusive, representations can be problematic for comfortable and/or safe travel of the vehicle 102. In such an example, the vehicle computing device(s) 110 may perceive the second additional vehicle 108(2) as likely to impede travel of the vehicle 102 and/or as an object with which the vehicle 102 may potentially collide such as by entering the lane 106(2). Accordingly, by representing the second additional vehicle 108(2) using a single, overinclusive representation like the third representation 114(3), the planning component may control the vehicle to perform an evasive maneuver, such as swerving, slowing down, and/or stopping the vehicle 102 to avoid the third object representation 114(3), despite the fact that the third additional vehicle 108(3) is in no way impeding or a threat to impede travel of the vehicle 102.

The additional vehicles 108 may also, or instead, be represented as multiple two-dimensional geometric structures, like the first object representation 114(1) and the second object representation 114(2). As illustrated, due to articulation of the first additional vehicle 108(1), the first object representation 114(1) is associated with a first portion (e.g., a tractor portion) and the second object representation 114(2) is associated with a second portion (e.g., a trailer portion). In this example, the first additional vehicle 108(1) is a tractor-trailer comprising a cab towing a trailer. The cab and trailer are not fixed as a rigid body, but instead, the trailer is attached such that it may pivot relative to the cab. The tractor-trailer represents one type of an articulated vehicle. Other types of articulated vehicles may include, but are not limited to, articulated buses, tow trucks with vehicles in tow, passenger vehicles towing other objects, or the like.

Generally, and as used herein, an articulated object may refer to any object having two or more bodies (portions) that are movable relative to each other. Articulated objects may be characterized as having a footprint that changes as a result of articulation of the object.

Generally, determining multiple representations for a single object rather than determining a single representation requires the vehicle computing device(s) 110 to use more computational resources (e.g., memory and/or processor allocation or usage) than determining a single representation, because the vehicle computing device(s) 110 detects and processes the tractor object and the trailer object as different objects in the environment. Accordingly, representing the additional vehicles 108 with multiple portions can cause the vehicle computing device(s) 110 to reduce an amount of available computational resources, which are limited.

As also illustrated in FIG. 1, the vehicle computing device(s) 110 include an articulated object modelling component 116. The articulated object modelling component 116 can include functionality, which is implemented, in part, via one or more models. In examples, the articulated object modelling component 116 may join, define, classify, or otherwise determine that two objects (or the corresponding object representations), such as the tractor and the trailer, are an articulated object in the environment 100. For instance, the articulated object modelling component 116 can apply heuristics and/or mathematical algorithms to sensor data associated with each object detected in the environment 100 to associate or join the two objects as a single articulated object. By implementing the articulated object modelling component 116, object representations for articulated objects may be generated that better represent the footprint of such objects.

The articulated object modelling component 116 can identify an articulated object in a variety of ways. For example, the articulated object modelling component 116 can determine if two object representations overlap and/or intersect with each other. For instance, the articulated object modelling component 116 can receive sensor data as input and identify that a portion of the first object representation 114(1) and a portion of the second object representation 114(2) includes an overlap 118. The articulated object modelling component 116 may also, or instead, determine an intersection point 120 between the first object representation 114(1) and the second object representation 114(2). In FIG. 1 the intersection point 120 is shown between a midline 122 of a first object (the tractor) and a midline 124 of a second object (the trailer), though the intersection point 120 may also be associated with one or more points of a boundary or edge of an object representation. Based at least in part on the overlap 118 and/or the intersection point 120, the articulated object modelling component 116 can define an articulated object as encompassing both the first object representation 114(1) and the second object representation 114(2).

In various examples, the articulated object modelling component 116 can define an articulated object based at least in part on a sized of a detected object. For example, the articulated modelling component 116 may compare the size (e.g., length, width, area, volume, or the like) of a detected object, to a size threshold. For instance, an object representation that meets or exceeds the size threshold can be combined with another adjacent, intersecting, and/or overlapping object representation. The articulated object modelling component 116 can also, or instead, determine a distance between a point of the first object representation 114(1) and another point of the second object representation 114(2), and determine that the respective objects are joined based on the distance being less than a distance threshold, for example. Additional details for determining articulated objects can be found throughout this disclosure including in FIG. 2 and the description accompanying that figure.

In various examples, an output by the articulated object modelling component 116 identifying an articulated object can be used by other models and components of the vehicle computing device(s) 110 such as a different motion model (e.g., an articulated object motion model 126) that tracks movement of the articulated object over time. By dedicating a model to track movement based on the unique characteristics of an articulated object, determinations by the motion model can efficiently make use of available computational resources (e.g., memory and/or processor allocation or usage) while also improving accuracy of predictions. That is, the motion model can determine future states of the articulated object in less time and with more accuracy than a model that treats the portions of the articulated object as separate objects while also utilizing fewer processor and/or memory resources. In some examples, the functionality of the articulated object modelling component 116 and the articulated object motion model 126 can be combined into a single model and/or component.

Upon the articulated object modelling component 116 determining the presence of an articulated object, the vehicle computing device(s) 110 can implement one or more additional models to track motion of the articulated object (e.g., the first additional vehicle 108(1)). In some examples, the articulated object motion model 126 can identify future states of the first object representation 114(1) and the second object representation 114(2) based on a current state of one of the object representations (e.g., such as the front portion that directs travel of the rear portion). For example, the articulated object motion model 126 can predict future states of the first additional vehicle 108(1) in the environment 100 (e.g., predict a position, a velocity, and/or an orientation, etc. of the articulated object at a future time). The articulated object motion model 126 may, for example, receive object state data associated with the articulated object at a first time, apply one or more filtering algorithms to representative portions of the articulated object, and output updated state data for the articulated object at a second time in the future. For example, the articulated object motion model 126 may output predicted states of a tractor (e.g., a first portion) and a trailer (e.g., a second portion) in the future based at least in part on filtering techniques that identify mathematical relationships between the portions (e.g., a front portion and a rear portion relative to a direction of travel) of the articulated object. Additional details for determining motion of articulated objects can be found throughout this disclosure including in FIG. 3 and the description accompanying that figure.

Although the first object representation 114(1) and the second object representation 114(2) are shown in the example environment 100 as rectangles, other geometric shapes may be used for one or more of the object representations 114. For instance, the sensor data may be processed by the vehicle computing device to output a top-down illustration of the environment 100 in two-dimensions or a bird's eye view in three dimensions. Thus, regardless of the shape of the object representations 114, the articulated object modelling component 116 can determine when two object representations intersect and/or overlap.

Additional examples of determining object state data and vehicle state data based on sensor data can be found in U.S. patent application Ser. No. 16/151,607, filed on Oct. 4, 2018, entitled "Trajectory Prediction on Top-Down Scenes," which is incorporated herein by reference in its entirety and for all purposes. Additional examples of tracking objects can be found in U.S. patent application Ser. No. 16/147,328, filed on Sep. 28, 2018, entitled "Image Embedding for Object Matching," which is incorporated herein by reference in its entirety and for all purposes. Additional examples of selecting bounding boxes can be found in U.S. patent application Ser. No. 16/201,842, filed on Nov. 27, 2018, entitled "Bounding Box Selection," which is incorporated herein by reference in its entirety and for all purposes.

Additional examples of determining whether objects are related as an articulated object can be found in U.S. patent application Ser. No. 16/586,455, filed on Sep. 27, 2019, entitled "Modeling Articulated Objects," which is incorporated herein by reference in its entirety and for all purposes. Additional examples of tracking articulated objects over time can be found in U.S. patent application Ser. No. 16/804,717, filed on Oct. 4, 2018, entitled "Tracking Articulated Objects," which is incorporated herein by reference in its entirety and for all purposes.

Figure 2:
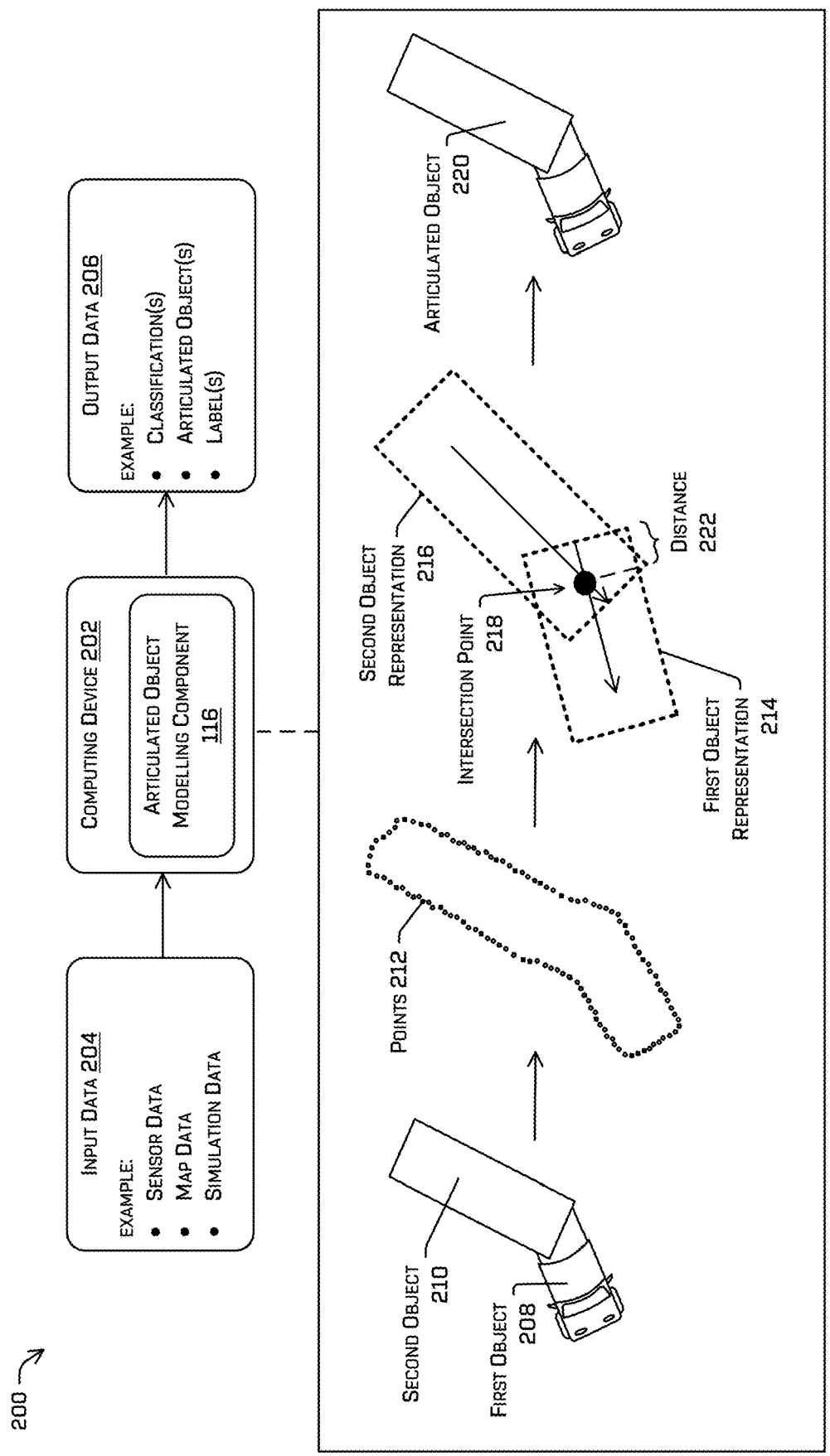
FIG. 2 is an illustration of another example environment in which one or more models determine presence of an articulated object.

FIG. 2 is an illustration of another example environment 200 in which one or more models determine presence of an articulated object. For instance, a computing device 202 can implement the articulated object modelling component 116 to associate or join two or more objects as a single articulated object with portions that move relative to each other. In some examples, the computing device 202 may be associated with vehicle computing device(s) 404 and/or computing device(s) 436.

In various examples, the articulated object modelling component 116 (also referred to as "the model") receives input data 204 and generates output data 206 representing a classification of two objects (e.g., a first object 208 and a second object 210) as an articulated object. The input data 204 can include one or more of: sensor data, map data, simulation data, and/or top-down representation data, and so on. Sensor data can include points 212 to represent an object and/or other features of the environment 100. The points 212 can be associated with sensor data from a LIDAR sensor, a RADAR sensor, a camera, and/or other sensor modality. The input data 204 can also, or instead, include a classification of an object as an object type (e.g., car, truck, tractor, trailer, boat, camper, pedestrian, cyclist, animal, tree, road surface, curb, sidewalk, lamppost, signpost, unknown, etc.). In some examples, the points 212 can be used to determine the first object representation 214 and the second object representation 216 while in other examples, the first object representation 214 and the second object representation 216 may be received as the input data 204 from another model. The points 212 may also be used to identify an articulated object. In one specific example, the first object 208 having an object type of a tractor and the second object 210 classified as a trailer may be depicted as a first object representation 214 and a second object representation 216 (e.g., rectangular bounding boxes) that substantially encompass the length and width of the respective object.

As noted above, the points 212 may be generated by one or more sensors on an autonomous vehicle (the vehicle 102) and/or may be derived from sensor data captured by one or more sensors on and/or remote from an autonomous vehicle. In some examples, the points 212 may be grouped as a plurality of points associated with a single object while in other examples the points 212 may be associated with multiple objects. In at least some examples, the points 212 may include segmentation information, which may associate each of the points 212 with the first object representation 214 or the second object representation 216. Although the points 212 include points forming (or outlining) a generally continuous contour, in other examples, sensors may provide data about fewer than all sides. In some examples, the points 212 may be estimated for hidden or occluded surfaces based on known shapes and sizes of objects.

In some examples, the articulated object modelling component 116 can join two objects in the environment 200 based on one or more heuristics and/or algorithms that identify a relationship between the objects and/or object types. In such examples, the model can determine to join the first object 208 and the second object 210 based on a size, an intersection, and/or an overlap of the first object representation 214 and the second object representation 216. For instance, the model may apply a physical heuristic, a physics algorithm, and/or a mathematical algorithm (e.g., linear algebra) to identify an articulated object based at least in part on at least one of the object representations (or a combination thereof) being larger than a threshold size, a distance between the object representations being within a threshold distance, an intersection point of the object representations, and/or an overlap of the object representations.

Examples of physical heuristic, a physics algorithm, and/or a mathematical algorithm can include one or more of: a length heuristic (e.g., an object over a certain length such as when the object is in a straight line), a joining heuristic (e.g., an object center point is joinable with another object center point), a motion equation, a dynamics algorithm, a kinematics algorithm, a size heuristic, a distance heuristic, an intersection point algorithm, and/or an algorithm that determines an intersection and/or a distance between centerlines of two objects, just to name a few. In one specific example, the articulated object modelling component 116 can classify two objects in the environment 200 as an articulated object based on a size heuristic (e.g., one of the two objects is above a size threshold), a distance heuristic (e.g., a distance between points or midlines of the two objects), and/or a joining point heuristic (adjoining center points of the two objects are within a threshold distance of each other). In some examples, the size heuristic can include the model 116 determining a maximum allowable length of a single vehicle (e.g., a State law that limits an overall length of the single vehicle), and determining the articulated object based on the length of an object being over the maximum allowable length (e.g., an object over 40 feet is associated with another object as the articulated object because the single vehicle is limited to 40 feet). Thus, the model 116 can employ the size heuristic to identify a recreational vehicle, truck, and/or tractor that is towing a boat, another vehicle, or a trailer.

The articulated object modelling component 116 can also, or instead, join two objects as the articulated object based at least in part on comparing data from different sensor modalities. If data from two sensor modalities are both associated with a same object type (a LIDAR sensor and a camera sensor both "see" a tractor portion or a trailer portion of a semi-truck), the model can combine two objects as the articulated object. For example, the model can compare LIDAR data representing an object with camera data to determine if the object represented by the LIDAR data is a same object represented by the camera data (e.g., does a camera sensor detect a same object as the LIDAR sensor). By way of example and not limitation, the LIDAR data can be associated with a vehicle such as a truck, and the one or more camera sensors can verify if the truck exists. In examples when the camera data represents a same object as the LIDAR data, the model 116 can determine presence of the articulated object based on data from both sensor modalities. In examples when the camera data does not represent the same object as the LIDAR data, the model 116 can determine presence of the articulated object based on the camera data.

The articulated object modelling component 116 can, in some examples, determine a first size of the first object representation 214 and a second size of the second object representation 216, and compare the first size or the second size to a size threshold. For instance, when a length, a width, and/or an area of an object representation meets or exceeds a threshold length, width, area, the model (or the component or the system) joins the object representation with an overlapping or adjacent object to define an articulated object 220. In some examples, only one of the two sizes of the object representations need to meet or exceed the threshold size to join two objects. In other examples, a combined size of both object representations can be compared to the size threshold, and based on the comparison, the objects can be joined as the articulated object 220 (the size meets or exceeds the size threshold) or the objects cannot be joined (the size is less than the size threshold).

The articulated object modelling component 116 may also, or instead, identify, classify, or otherwise determine an articulated object based at least in part on a distance between two points (e.g., a point associated with a midline, a center, a boundary, etc.) associated with each respective object. For example, the model can determine a distance between one or more points of the first object representation 214 and one or more points associated with the second object representation 216 and join the first object 208 and the second object 210 as the articulated object 220 based at least in part on to a comparison of the distance to a distance threshold. The distance may be between points associated with a midline or a boundary, just to name a few. For instance, a distance between a point associated with a midline, a center, and/or a boundary of the first object representation 214 and another point associated with a midline, a center, and/or a boundary of the second object representation 216 may be compared to a distance threshold to determine that the first object representation 214 and the second object representation 216 the articulated object 220. In examples when the distance between two boundary points of two object representations is equal to or less than a 1 meter distance threshold, the articulated object modelling component 116 can output a classification that the objects are joined as the articulated object 220.

In some examples, the distance between one or more points of the first object representation 214 and one or more points associated with the second object representation 216 can include a distance 222 between the intersection point 218 of the first object representation 214 and point(s) at a boundary of the first object representation 214 and/or a boundary of the second object representation 216. Generally, the distance 222 can represent a maximum extent of the first object representation 214 and/or the second object representation 216. In some examples, the articulated object motion model 126 may track motion of the articulated object 220 over time including determining changes in a position of the first object representation 214 relative to the second object representation 216. For instance, the model may determine a joint intersection between the first object representation 214 and the second object representation 216 in a two-dimensional (e.g., x-y) coordinate system using the following equations.

$$\begin{bmatrix} x_0 \\ y_0 \end{bmatrix} + \alpha \begin{bmatrix} C_{\theta_0} \\ S_{\theta_0} \end{bmatrix} = \begin{bmatrix} x_1 \\ y_1 \end{bmatrix} + \beta \begin{bmatrix} C_{\theta_1} \\ S_{\theta_1} \end{bmatrix} \quad (1)$$

$$\begin{bmatrix} \alpha \\ \beta \end{bmatrix} = \frac{1}{S_{\theta_0 - \theta_1}} \begin{bmatrix} -S_{\theta_1} & C_{\theta_1} \\ -S_{\theta_0} & C_{\theta_0} \end{bmatrix} \begin{bmatrix} x_0 - x_1 \\ y_0 - y_1 \end{bmatrix} \quad (2)$$

$$\tilde{E}_{x_0} = E_{x_0} \times 0.5 + \alpha + \delta \quad (3)$$

$$\tilde{E}_{x_1} = E_{x_1} \times 0.5 + \beta + \delta \quad (4)$$

where C=cosine, S=Sine, θ=object state such as a yaw value, δ=distance 222, α=distance from a center point to an end point of a first object, and β=distance from a center point to an end point of a second object. Equation (1) can represent an intersection point between two objects while equation (2) is a rearranged form of equation (1). Equations (3) and (4) output representations of the first object and the second object (e.g., the first object representation 214 and the second object representation 216).

In various examples, the articulated object modelling component 116 can determine the articulated object 220 based on determining that two or more object representations intersect and/or overlap. For instance, the first object representation 214 may have a point (e.g., a midline point, a center point, an edge point) that intersects and/or overlaps with a corresponding point of the second object representation 216. In one specific example, the first object representation 214 may have a midline that intersects with another midline of the second object representation 216. The model can output a classification that the first object 208 and the second object 210 represent the articulated object 220 based at least in part on determining that points of the object representations intersect and/or that at least some portions of each object representations overlap.

The articulated object modelling component 116 may also, or instead, identify, classify, or otherwise determine an articulated object based at least in part on a control policy associated with the input data 204. For instance, the computing device can identify behaviors of the first object and the second object over time (based on sensor data, map data, and so on), and apply a control policy, such as a right of way or a rule at an intersection to join the first object and the second object in the environment. By way of example and not limitation, the articulated object modelling component 116 can identify, detect, or otherwise determine that two object representations proceed simultaneously from a stop sign, a green light, and so on.

The articulated object modelling component 116 can, in some examples, receive sensor data over time and adjust, update, or otherwise determine a relationship between portions of the articulated object. For instance, the model 116 can disjoin, or reclassify, an articulated object as two separate objects based on the sensor data indicating the portions (or object representations) are no longer related (e.g., the portions became detached due to an accident or were erroneously determined to be an articulated object at an earlier time, etc.). That is, the model 116 can, based at least in part on a change in the relationship, update a classification of the first object and the second object (or additional objects making up the articulated object). In such examples, the relationship may be indicative of a covariant relationship between points of respective object representations. In some examples, the model 116 can define the covariant relationship to include covariance between a distance, a yaw, a velocity, and so on associated with different object representations.

Figure 3:
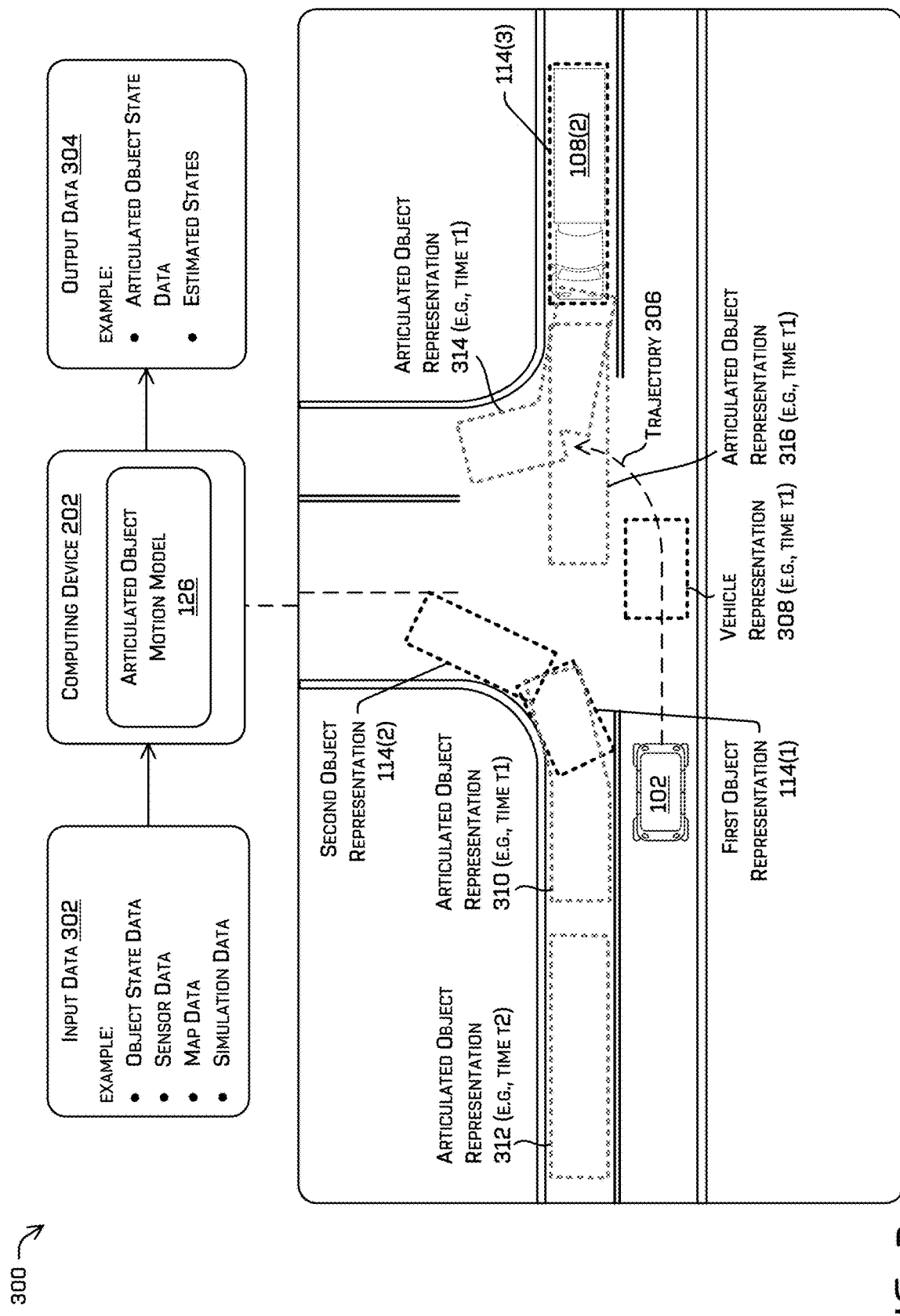
FIG. 3 is an illustration of another example environment in which one or more models determine potential states of an articulated object at a future time.

FIG. 3 is an illustration of another example environment 300 in which one or more models determine potential states of an articulated object at a future time. For instance, the computing device 202 can implement the articulated object motion model 126 to predict future states of the articulated object 220. In some examples, the computing device 202 may be associated with vehicle computing device(s) 404 and/or computing device(s) 436.

In various examples, the articulated object motion model 126 receives input data 302 (e.g., object state data, sensor data, map data, simulation data, etc.) from one or more models and/or components, and generates output data 304 representing articulated object state data at time(s) in the future. The input data 302 can include object state data state data (e.g., one or more of: position data, orientation data, heading data, velocity data, speed data, acceleration data, yaw rate data, or turning rate data, just to name a few) associated with the first object 208 and/or the second object 210. Generally, the articulated object motion model 126 can predict a change in position, heading, yaw, velocity, acceleration, and/or the like for the articulated object 220 over time based at least in part on the input data 302.

The articulated object motion model 126 may, using one or more algorithms, define a relationship (e.g., a covariant relationship) between points and/or states of a first object and points and/or states of a second object of the articulated object. In this way, state data associated with the first object can be used to predict state data associated with the second object. For example, the model 126 can use state data associated with a tractor or a trailer to predict state data associated with the other of the tractor of the trailer. In some examples, the model 126 receive sensor data over time and adjust and/or update the relationship between portions (e.g., object representations) of the articulated object.

The articulated object motion model 126 may generate sets of estimated states of the vehicle 102 and one or more detected articulated objects forward in the environment 300 over a time period. The articulated object motion model 126 may generate a set of estimated states for each action (e.g., reference action and/or sub-action of an object and/or the vehicle) applicable to the environment. The sets of estimated states may include one or more estimated states, each estimated state including an estimated position of the vehicle and an estimated position of the articulated object 220. In some examples, the estimated states may include estimated positions of the articulated object 220 at an initial time (T=0) (e.g., current time).

The model 126 may determine the estimated positions based on a detected trajectory and/or predicted trajectories associated with the articulated object 220. In some examples, the model 126 can determine the estimated positions based on an assumption of substantially constant velocity and/or substantially constant trajectory (e.g., little to no lateral movement of the object). In some examples, the estimated positions (and/or potential trajectories) may be based on passive and/or active prediction. In some examples, the articulated object motion model 126 may utilize physics and/or geometry-based techniques, machine learning, linear temporal logic, tree search methods, heat maps, and/or other techniques for determining predicted trajectories and/or estimated positions of articulated objects.

In various examples, the estimated states may be generated periodically throughout the time period. For example, the articulated object motion model 126 may generate estimated states at 0.1 second intervals throughout the time period. For another example, the articulated object motion model 126 may generate estimated states at 0.05 second intervals. The estimated states may be used by the planning component 426 in determining an action for the vehicle 402 to take in an environment (e.g., determining a planned trajectory such as trajectory 306). In some examples, the articulated object motion model 126 may generate a vehicle representation 308 for time T1 (and optionally other times) to represent an estimated state of the vehicle 102 at different times in the future.

In various examples, the articulated object motion model 126 may utilize filtering techniques to predict future states of one or more articulated objects. In such examples, the filtering algorithms may determine a covariance and/or a mean between points of the first object representation 214 and the second object representation 216 as updated articulated state data (position, velocity, acceleration, trajectory, etc.) at a future time. For example, the articulated object motion model 126 can apply a filter algorithm (e.g., a Kalman filter) to object state data associated with the first object 208 and/or the second object 210, and determine future states of both portions (or representations) of the articulated object 220. In this way, the articulated object motion model 126 can predict future states for both portions of the articulated object more accurately and in less time versus predicting state data for both portions separately and without consideration to the portions being joined as an articulated object.

The articulated object motion model 126 can be thought of as a "joined motion model" since it predicts motion of all portions of an articulated object (a front portion and additional connected rear portion(s)). For example, a first portion may direct motion of the second portion in the future (e.g., movement by a tractor directs movement of the one or more trailers). By determining that the two portions are connected as an articulated object, the articulated object motion model 126 can quickly predict a future position, a future velocity, and the like of the second portion based on data (a current orientation, a current velocity, etc.) associated with the first portion. Thus, the articulated object motion model 126 can output predictions (e.g., a trajectory, a position, a yaw, etc.) associated with an articulated object in less time and with more accuracy versus predicting all possible states for both portions of the articulated object separately.

For example, the articulated object motion model 126 can output an articulated object representation 310 for time T1 and an articulated object representation 312 for time T2 associated with the first additional vehicle 108(1). The articulated object motion model 126 can also, or instead, output an articulated object representation 314 for time T1 and/or an articulated object representation 316 for time T1 associated with the additional vehicle 108(2). The articulated object motion model 126 can generate two or more object representations for a same time to represent possible actions the additional vehicle 108(2) may take at a future time. In this way, the articulated object motion model 126 can determine a predicted position of the additional vehicle 108(2) based on road conditions (e.g., straight or right turn as shown in FIG. 3). The articulated object representations 310, 312, 314, and/or 316 can be used by the computing device to perform a simulation involving the vehicle 102 (e.g., using one or more vehicle representations, such as the vehicle representation 308). In various examples, the simulation can account for a reference action taken by the vehicle 102 and/or the additional vehicle 108(2) at a future time, and a sub-action by the vehicle 102 and/or the additional vehicle 108(2) responsive to the reference action.

In one specific example, the articulated object motion model 126 can employ an extended Kalman filter or an unscented Kalman filter to calculate, generate, or otherwise determine predicted states of all portions (the truck and the trailer) of the articulated object. By employing one or more filters as described herein, predicting a future location, velocity, or trajectory of the articulated object can be performed using fewer processor and/or memory resources that models that do not identify a relationship between two objects or portions.

In some examples, the articulated object motion model 126 can employ a Kalman filter in which a decomposition algorithm and/or a ranking algorithm is substituted for another algorithm to "speed up" calculations based on the Kalman filter. For example, the model 126 can utilize a modified unscented Kalman filter that determines a covariance from sigma points such that the computational resources can determine a prediction in less time versus using typical square root unscented Kalman filters. The modified Kalman filter can include substituting operations of a QR decomposition and a Cholesky rank one downdate (which relies on performing a matrix calculation) with "2N rank one updates" and "one rank one downdate" operations to reduce processing latency. In this way, the modified Kalman filter can utilize covariance symmetry by employing "2N rank one symmetric updates" and "one rank one symmetric downdate". In some examples, the model 126 can selectively employ the modified Kalman filter to remove processing of Jacobian matrices to improve an overall processing speed at which the model 126 can determine predictions. Thus, the modified Kalman filter can represent a mathematical enhancement to a Kalman filter that relies on derivative calculations.

In some examples, the articulated object motion model 126 can determine, as a correlation, a characteristic (e.g., a first velocity, a first position, etc.) of the first portion and a characteristic (e.g., a second velocity, a second position, etc.) of the second portion. In such examples, the model can generate output data representing a predicted state of the first portion and the second portion based at least in part on the correlation.

The articulated object motion model 126 is configured to determine an offset value between two object representations and predict future states for one or both of the portions of the articulated object based at least in part on the offset value. For example, the articulated object motion model 126 can receive state data of a first object representation (e.g., velocity of a truck), and predict a future velocity of the second representation (e.g., the trailer) based on the offset value. In some examples, the model can apply linear and/or non-linear algorithms to determine a covariance and/or a mean between one or more points of the first object representation 114(1) and one or more points of the second object representation 114(2). The articulated object motion model 126 may, in some examples, determine a covariance between sampled points associated with each object representation, and use the covariance to determine the output data 304 (e.g., predicted states of both portions of the articulated object).

In various examples, the articulated object motion model 126 determines the offset value to represent a displacement or difference in a position (e.g., x, y, z in a three-dimensional coordinate system), a heading, a yaw, a velocity, an acceleration, etc. between two or more object representations making up an articulated object. The articulated object motion model 126 can generate the output data 304 in less time and with more accuracy based on the offset value without consideration to the infinite potential positions, headings, etc. considered by a model that does not determine an offset value.

The articulated object motion model 126 can also, or instead, determine the output data 304 by employing linear algebra and other mathematical algorithms that do not rely on derivative calculations (or Jacobian matrices) thereby reducing an amount of time required to process the input data 302. By implementing the articulated object motion model 126, processing resources to determine precited states of articulated objects can be generated in less time versus not using the model which provides more computational resources to the computing device 202 for other processing (e.g., process additional objects in the environment), which improves safety of the vehicle 102. In some examples, the articulated object motion model 126 can determine future states of an articulated object up to four times faster than conventional models that do not consider relationships of portions making up articulated objects.

Figure 4:
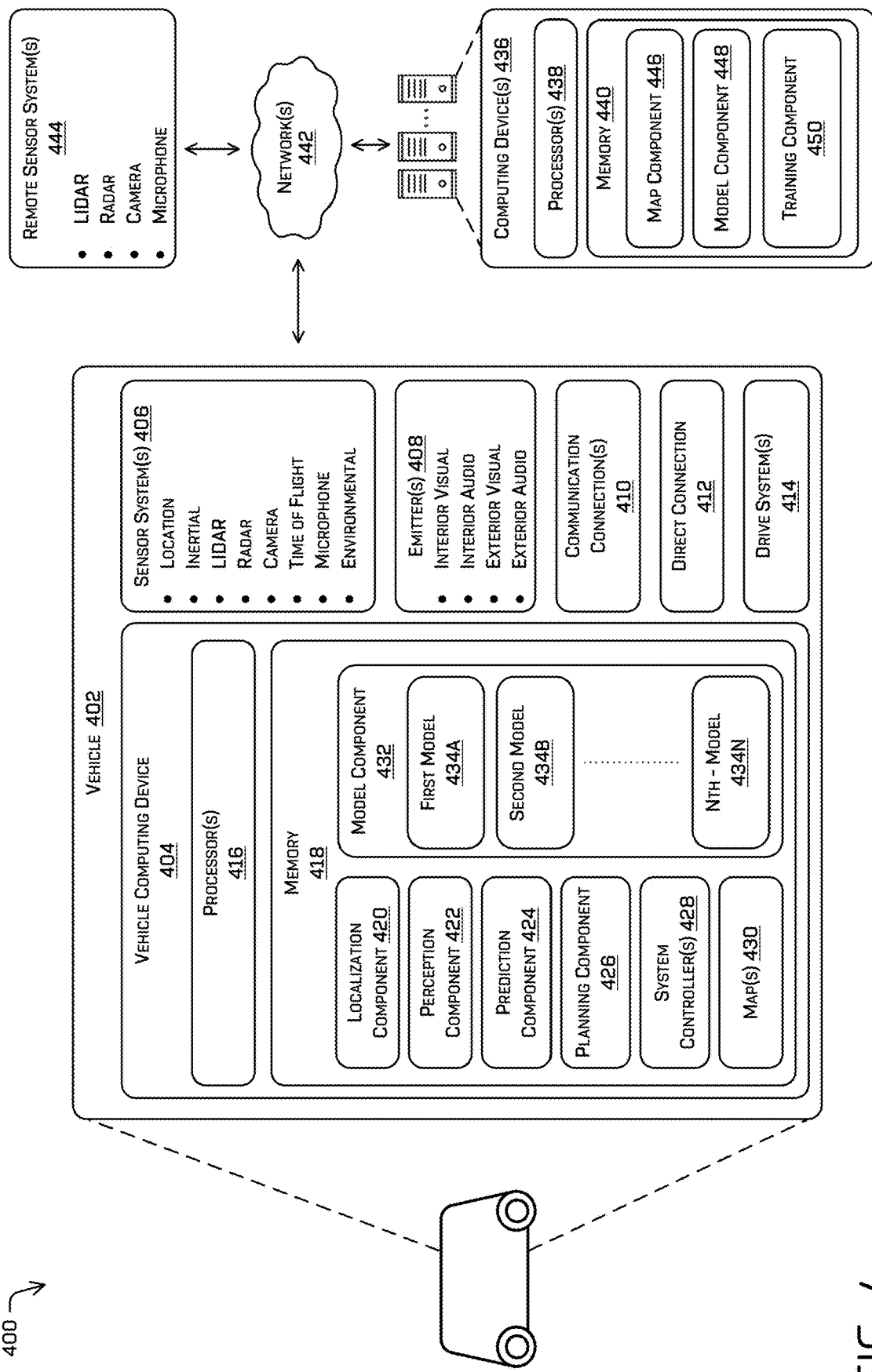
FIG. 4 depicts a block diagram of an example system for implementing the techniques described herein.

FIG. 4 illustrates a block diagram of an example system 400 for implementing the techniques described herein. In at least one example, the system 400 can include a vehicle 402, which can be the same vehicle as the vehicle 102 described above with reference to FIG. 1.

The vehicle 402 may include a vehicle computing device 404, one or more sensor systems 406, one or more emitters 408, one or more communication connections 410, at least one direct connection 412, and one or more drive system(s) 414.

The vehicle computing device 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device 404 may store sensor data associated with actual location of an object at the end of the set of estimated states (e.g., end of the period of time) and may use this data as training data to train one or more models. In some examples, the vehicle computing device 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference for all purposes.

In the illustrated example, the memory 418 of the vehicle computing device 404 stores a localization component 420, a perception component 422, a prediction component 424, a planning component 426, one or more system controllers 428, one or more maps 430, and a model component 432 including one or more model(s), such as a first model 434A, a second model 434B, up to an Nth model 434N (collectively "models 434"), where N is an integer. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the model component 432 including the model(s) 434 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, LIDAR data, RADAR data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In implementations, the perception component 422 can specifically identify articulated objects, such as articulated vehicles. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for articulated objects, vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., articulated objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can select a trajectory for the vehicle 402 based at least in part on receiving data representing an output of the model component 432.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from the articulated object modelling component 116 and/or the articulated object motion model 126 as described in FIGS. 1-3 and elsewhere.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device 404 may include a model component 432. The model component 432 may be configured to perform the functionality of the articulated object modelling component 116 and/or the articulated object motion model 126, including predicting presence and/or motion of articulated objects, such as with the additional vehicles 108(1) and 108(2), and the articulated object 220. In various examples, the model component 432 may receive one or more features associated with the detected object(s) from the perception component 422 and/or from the sensor system(s) 406. For instance, the articulated object modelling component 116 can receive data, e.g., sensor data, associated with two or more objects and determine presence of an articulated object in an environment. In some examples, the model component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 432 could be part of the prediction component 424, the planning component 426, or other component(s) of the vehicle 402.

In various examples, the model component 432 may send predictions from the one or more models 434 that may be used by the prediction component 424 and/or the planning component 426 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the model component 432 may be configured to determine whether an articulated object intersects with the vehicle 402 based at least in part on the one or more actions for the vehicle 402. In some examples, the model component 432 may be configured to determine the actions that are applicable to the environment, such as based on environment characteristics, weather characteristics, or the like.

The model component 432 may generate sets of estimated states of the vehicle and one or more detected objects forward in the environment over a time period. The model component 432 may generate a set of estimated states for each action (e.g., reference action and/or sub-action) applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The model component 432 may determine the estimated positions based on a detected trajectory and/or predicted trajectories associated with the object. In some examples, determining the estimated positions may be based on an assumption of substantially constant velocity and/or substantially constant trajectory (e.g., little to no lateral movement of the object). In some examples, the estimated positions (and/or potential trajectories) may be based on passive and/or active prediction. In some examples, the model component 432 may utilize physics and/or geometry based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 432 may generate estimated states at 0.1 second intervals throughout the time period. For another example, the model component 432 may generate estimated states at 0.05 second intervals. The estimated states may be used by the planning component 426 in determining an action for the vehicle 402 to take in an environment.

In various examples, the model component 432 may utilize machine learned techniques to predict risks associated with evaluated trajectories. In such examples, the machine learned algorithms may be trained to determine, based on sensor data and/or previous predictions by the model, that an object is likely to behave in a particular way relative to the vehicle 402 at a particular time during a set of estimated states (e.g., time period). In such examples, one or more of the vehicle 402 state (position, velocity, acceleration, trajectory, etc.) and/or the articulated object state, classification, etc. may be input into such a machine learned model and, in turn, a behavior prediction may be output by the model.

In various examples, characteristics associated with each object type may be used by the model component 432 to determine an object velocity or acceleration for predicting potential intersection(s) between objects and/or between the vehicle 402 and one or more objects. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 420, the perception component 422, the prediction component 424, the planning component 426, the one or more system controllers 428, the one or more maps 430, the model component 432 including the model(s) 434 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the LIDAR sensors may include individual LIDAR sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the model component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the model component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, a sensor data processing component 448, and a training component 450. In some examples, the map component 446 may generate maps of various resolutions. In such examples, the map component 446 may send one or more maps to the vehicle computing device 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device 404, such as for use by the model component 432 (e.g., the model(s) 434). In some examples, the sensor data processing component 448 may be configured to send raw sensor data to the vehicle computing device 404.

In some instances, the training component 450 can train a machine learning model to output articulated object trajectories. For example, the training component 450 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 450 may be executed by the processor(s) 438 to train the a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 450 can train a machine learning model to output classification values. For example, the training component 450 can receive data that represents labelled collision data (e.g. publicly available data, sensor data, and/or a combination thereof). At least a portion of the data can be used as an input to train the machine learning model. Thus, by providing data where the vehicle traverses an environment, the training component 450 can be trained to output potential intersection(s) associated with objects, as discussed herein.

In some examples, the training component 450 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5:
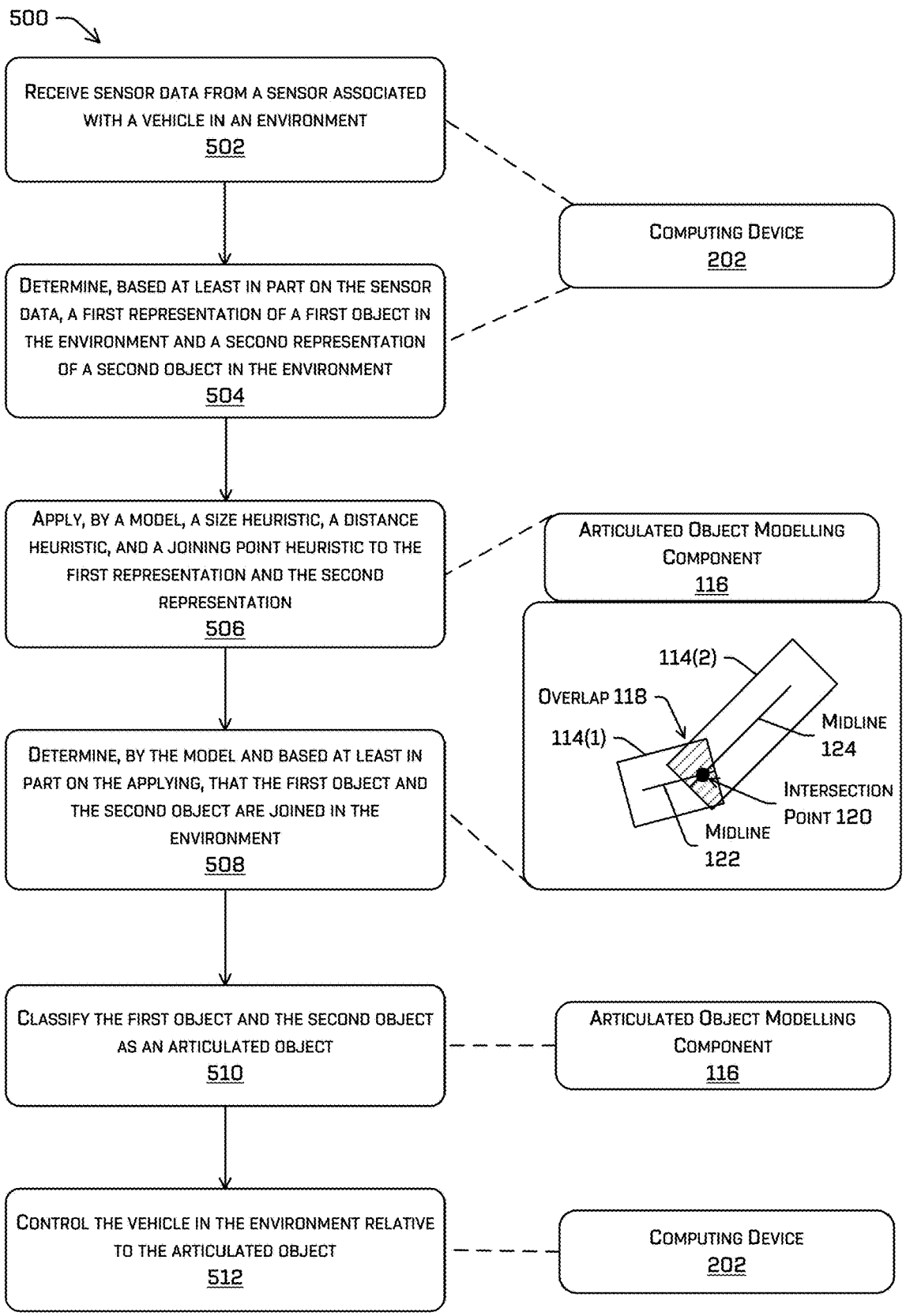
FIG. 5 is a flowchart illustrating an example process for determining articulated objects using one or more example models.
Figure 6:
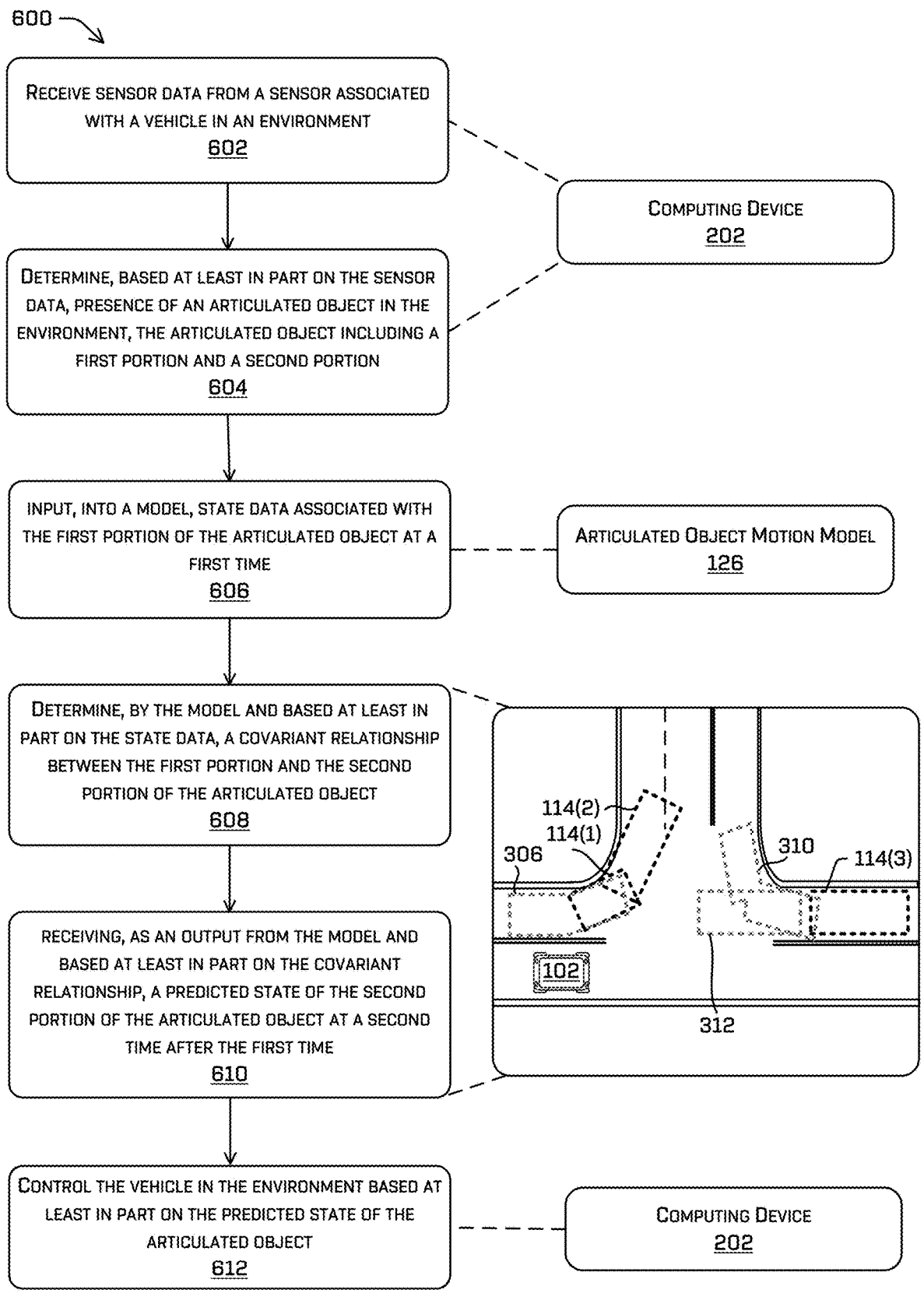
FIG. 6 is a flowchart illustrating an example process for determining potential states of an articulated object at a future time using one or more example models.

FIGS. 5 and 6 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

FIG. 5 is a flowchart illustrating an example process 500 for determining articulated objects using one or more example models. For example, some or all of the process 500 can be performed by one or more components in FIG. 4, as described herein. For example, some or all of the process 500 can be performed by the vehicle computing device 404 or the computing device 202. However, the process 500 is not limited to being performed by these components, and the components are not limited to performing the process 500.

At operation 502, the process 500 can include receiving sensor data from a sensor associated with a vehicle in an environment. In some examples, the operation 502 can include a computing device receiving sensor data from the perception component 422. The sensor data may be received from one or more sensors on the vehicle and/or from one or more remote sensors. For example, techniques described herein may be useful to detect articulated objects, and the operation 502 may include receiving a group, blob, or cluster of points (e.g. points 212) associated with an articulated object. The points may be generated by one or more sensors, such as a LIDAR sensor, or may be generated from sensor data associated with two or more sensors (e.g., fused data). In at least some examples, the points may have an associated position, e.g., in an x-y coordinate system. In some examples, the sensor data can be processed to determine a two-dimensional representation of the environment (e.g., top-down multi-channel data, vector data, an occupancy grid, etc.).

At operation 504, the process 500 can include determining, based at least in part on the sensor data, a first representation of a first object in the environment and a second representation of a second object in the environment. For instance, the computing device can generate a first object representation 214 to represent a tractor and a second object representation 216 to represent a trailer. The first object representation 214 or the second object representation 216 can be a bounding box having a length and a width of the respective object as a top-down view.

At operation 506, the process 500 can include applying, by a model, a size heuristic, a distance heuristic, and a joining point heuristic to the first representation and the second representation. For instance, the operation 506 can include the articulated object modelling component 116 applying one or more heuristics and/or algorithms to the first object representation 214 and the second object representation 216 to identify a relationship between sizes, distances, and/or points of the object representations. As detailed above in FIGS. 1 and 2, the articulated object modelling component 116 can apply mathematical techniques to identify a size of an object representation, a distance between object representations, an intersection between object representations, and/or an overlap between object representations.

At operation 508, the process 500 can include determining, by the model and based at least in part on the applying, that the first object and the second object are joined in the environment. For example, the operation 508 can include the articulated object modelling component 116 determining to join the first object 208 and the second object 210 based at least in part on the size of an object representation and/or the distance, the intersection, or the overlap between the object representations. For example, the size of the first object representation 214 can be compared to a size threshold, and combined with the second object representation 216 when the size meets or exceeds a size threshold. Additionally or alternatively, the articulated object modelling component 116 can join the first object 208 and the second object 210 based on determining that at least some portions of the objects overlap and/or intersect.

At operation 510, the process 500 can include classifying the first object and the second object as an articulated object. For example, the articulated object modelling component 116 can generate output data 206 classifying the first object 208 and the second object 210 as a single articulated object (e.g., the articulated object 220). In this way, the articulated object modelling component 116 can detect presence of an articulated object in the environment, and send information about the articulated object to one or more other components of the computing device.

At operation 512, the process 500 can include controlling the vehicle in the environment relative to the articulated object. In some examples, the operation 512 can include a planning component (e.g., planning component 424) of the vehicle computing system using the predictions received from the articulated object modelling component 116 and/or the articulated object motion model 126 to control a vehicle as it navigates in an environment (vehicle 102 using the trajectory 306). In various examples, predictions from the first model 434A, the second model 434B, and/or the Nth model 434N enable a planning component of the vehicle to improve how the vehicle navigates (avoids objects) in the environment. For example, the computing device can determine a trajectory for the vehicle based at least in part on the output from the articulated object modelling component 116 indicating presence of the articulated object. In some examples, data representing an output from a model is sent to a perception component (e.g., perception component 422) to change at least one of a resolution, a bit rate, a rate of capture, or a compression at which sensor data is captured or stored. In various examples, setting(s) associated with the sensor system (e.g., sensor system 406) may be adjusted to cause one or more sensors of the vehicle to change operation based at least in part on a signal output from a model and sent to the perception component. The articulated object modelling component 116

FIG. 6 is a flowchart illustrating an example process 600 for determining potential states of an articulated object at a future time using one or more example models. For example, some or all of the process 600 can be performed by one or more components in FIG. 4, as described herein. For example, some or all of the process 600 can be performed by the vehicle computing device 404 or the computing device 202. However, the process 600 is not limited to being performed by these components, and the components are not limited to performing the process 600.

At operation 602, the process can include receiving sensor data from a sensor associated with a vehicle in an environment. In some examples, the operation 602 can include a computing device receiving sensor data from one or more sensors on the vehicle and/or from one or more remote sensors. Techniques described herein may be useful to determine presence and/or motion of an articulated object. In some examples, the sensor data can include data fused from one or more sensor modalities, including a time-of-flight sensor, LIDAR, RADAR, or the like.

At operation 604, the process 600 can include determining, based at least in part on the sensor data, presence of an articulated object in the environment, the articulated object including a first portion and a second portion. For example, the computing device 202 can employ the articulated object modelling component 116 to classify two or more objects as an articulated object, and output an indication of the articulated object to one or more other components of the vehicle computing device(s) 404. The articulated object can include at least two portions such as a front portion and one or more rear portions.

At operation 606, the process 600 can include inputting, into a model, state data associated with the articulated object at a first time. For example, the articulated object motion model 126 can receive object state data such as position data, orientation data, heading data, velocity data, speed data, acceleration data, yaw rate data, or turning rate data associated with one or more portions of the articulated object usable to determine relative movement, e.g., velocity, position, acceleration, and so on of both of portions of the articulated object. In some examples, the computing device can determine the state data based on comparing historical sensor data to determine position, orientation, heading, velocity, and so on of objects having a same object type.

At operation 608, the process 600 can include determining, by the model and based at least in part on the state data, a mathematical relationship between the first portion and the second portion of the articulated object. In some examples, the operation 608 can include the articulated object motion model 126 determining a joint offset value indicating a displacement between the first portion (the first object representation 214) and the second portion (the second object representation 216). Additionally or alternatively, the articulated object motion model 126 can use the state data to determine a covariance and/or a mean between the two portions. In some examples the operation 608 can include implementing linear algebra algorithms that determine a relationship between the first portion and the second portion of the articulated object. The articulated object motion model 126 can also, or instead, employ filtering techniques, such as applying a Kalman filter, to select points associated with the first object representation 214 and/or the second object representation 216. Based on the selected points, the computing device determine motion of the first portion relative to the second portion.

At operation 610, the process 600 can include receiving, as an output from the model and based at least in part on the mathematical relationship, a predicted state of the first portion and the second portion of the articulated object at a second time after the first time. In some examples, the operation 610 can include the articulated object motion model 126 using information about the mathematical relationship to predict a combined state of the first portion and the second portion at a future time. For example, the computing device can determine estimated states of the articulated object based at least in part on the filtering techniques discussed herein.

At operation 612, the process 600 can include controlling the vehicle in the environment based at least in part on the predicted state of the articulated object. For instance, the vehicle computing device 404 can determine a trajectory for the vehicle 402 based on the predicted state of the first portion and the second portion in the future. In some instances, the operation 612 can include generating commands that can be relayed to a controller onboard an autonomous vehicle to control the autonomous vehicle to drive a travel path according to the trajectory. Although discussed in the context of an autonomous vehicle, the process 600, and the techniques and systems described herein, can be applied to a variety of systems utilizing sensors.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving sensor data from a sensor associated with a vehicle in an environment; determining, based at least in part on the sensor data, a first representation of a first object in the environment and a second representation of a second object in the environment; applying, by a model, a size heuristic, a distance heuristic, and a joining point heuristic to the first representation and the second representation; determining, by the model and based at least in part on the applying, that the first object and the second object are joined in the environment; classifying the first object and the second object as an articulated object; and controlling the vehicle in the environment relative to the articulated object.

B: The system of paragraph A, wherein: the first representation or the second representation includes a top-down representation, and the size heuristic, the distance heuristic, or the joining point heuristic applied by the model comprises a mathematical algorithm.

C: The system of paragraph A or B, wherein applying the size heuristic to the first representation and the second representation comprises: determining a first size of the first representation and a second size of the second representation; and comparing the first size or the second size to a size threshold, wherein determining that the first representation of the first object and the second representation of a second object are joined is based at least in part on the first size or the second size meeting or exceeding the size threshold.

D: The system of any of paragraphs A-C, wherein applying the distance heuristic to the first representation and the second representation comprises: determining a distance between a first point of the first representation and a second point of the second representation; and comparing the distance to a distance threshold, wherein determining that the first representation of the first object and the second representation of a second object are joined is based at least in part on the distance being less than the distance threshold.

E: The system of any of paragraphs A-D, the operations further comprising: determining a predicted position of the articulated object at a future time, wherein controlling the vehicle in the environment relative to the articulated object comprises determining a planned trajectory for the vehicle based at least in part on the predicted position of the articulated object.

F: A method comprising: receiving sensor data from a sensor associated with a vehicle in an environment; determining, based at least in part on the sensor data, a first representation of a first object in the environment and a second representation of a second object in the environment; applying, by a model, one or more heuristics to the first representation and the second representation; and joining, by the model and based at least in part on the applying, the first object and the second object as an articulated object.

G: The method of paragraph F, wherein the model is a first model, and further comprising: determining, by a second model and based at least in part on the sensor data, data comprising a top-down representation of an environment; inputting the data into the first model; and controlling the vehicle in the environment relative to the articulated object.

H: The method of paragraph F or G, wherein the one or more heuristics applied by the model comprises one or more of: a physical heuristic, a physics algorithm, or a linear algebra algorithm.

I: The method of any of paragraphs F-H, wherein applying the one or more heuristics to the first representation and the second representation comprises: determining a first size of the first representation and a second size of the second representation; and comparing the first size or the second size to a size threshold, wherein joining the first representation of the first object and the second representation of a second object is based at least in part on the first size or the second size meeting or exceeding the size threshold.

J: The method of any of paragraphs F-I, wherein applying the one or more heuristics to the first representation and the second representation comprises: determining a distance between a first point of the first representation and a second point of the second representation; and comparing the distance to a distance threshold, wherein joining the first representation of the first object and the second representation of a second object is based at least in part on the distance being less than the distance threshold.

K: The method of any of paragraphs F-J, further comprising: determining a predicted position of the articulated object at a future time, wherein controlling the vehicle in the environment relative to the articulated object comprises determining a planned trajectory for the vehicle based at least in part on the predicted position of the articulated object.

L: The method of any of paragraphs F-K, wherein applying the one or more heuristics to the first representation and the second representation comprises: performing at least one of: determining that the first representation and the second representation overlap; or determining that a first midline of the first representation intersects with a second midline of the second representation, wherein joining the first representation of the first object and the second representation of a second object is based at least in part on the first representation and the second representation overlapping or the first midline and the second midline intersecting.

M: The method of any of paragraphs F-L, wherein the joining is associated with a first time, and further comprising: receiving additional sensor data from the sensor at a second time after the first time; applying, by the model, the one or more heuristics to the first representation and the second representation of the articulated object at the second time; and disjoining, based at least in part on the applying at the second time, the first object and the second object as the articulated object.

N: The method of any of paragraphs F-M, wherein: the first representation of the first object is a first shape having a first boundary, the second representation of the second object is a second shape having a second boundary, and the first shape or the second shape includes two dimensions or three-dimensions.

O: The method of any of paragraphs F-N, wherein joining the first representation of the first object and the second representation of the second object as the articulated object is further based at least in part on a control policy comprising information identifying a right of way or a rule of an intersection associated with the first object and the second object in the environment.

P: The method of any of paragraphs F-O, further comprising: determining a first object type of the first object and a second object type of the second object, the first object type or the second object type including at least one of: a car, a truck, a trailer, or a boat; and comparing, as a comparison, the first object type and the second object type, wherein joining the first representation of the first object and the second representation of the second object as the articulated object is further based at least in part on the comparison.

Q: One or more non-transitory computer-readable media storing instructions executable by one or more processors, wherein the instructions, when executed, cause the one or more processors to perform operations comprising: receiving sensor data from a sensor associated with a vehicle in an environment; determining, based at least in part on the sensor data, a first representation of a first object in the environment and a second representation of a second object in the environment; applying, by a model, one or more heuristics to the first representation and the second representation; and joining, by the model and based at least in part on the applying, the first object and the second object as an articulated object.

R: The one or more non-transitory computer-readable media of paragraph Q, wherein the one or more heuristics applied by the model comprises one or more of: a physical heuristic, a physics algorithm, or a linear algebra algorithm.

S: The one or more non-transitory computer-readable media of paragraph Q or R, wherein applying the one or more heuristics to the first representation and the second representation comprises: determining a first size of the first representation and a second size of the second representation; and comparing the first size or the second size to a size threshold, wherein joining the first representation of the first object and the second representation of a second object is based at least in part on the first size or the second size meeting or exceeding the size threshold.

T: The one or more non-transitory computer-readable media of any of paragraphs Q-S, wherein applying the one or more heuristics to the first representation and the second representation comprises: determining a distance between a first point of the first representation and a second point of the second representation; and comparing the distance to a distance threshold, wherein joining the first representation of the first object and the second representation of a second object is based at least in part on the distance being less than the distance threshold.

U: A system comprising: one or more processors; and one or more non-transitory computer-readable media storing instructions executable by the one or more processors, wherein the instructions, when executed, cause the system to perform operations comprising: receiving sensor data from a sensor associated with a vehicle in an environment; determining, based at least in part on the sensor data, presence of an articulated object in the environment, the articulated object including a first portion and a second portion; inputting, into a model, state data associated with the first portion of the articulated object at a first time; determining, by the model and based at least in part on the state data, a covariant relationship between the first portion and the second portion of the articulated object; receiving, as an output from the model and based at least in part on the covariant relationship, a predicted state of the second portion of the articulated object at a second time after the first time; and controlling the vehicle in the environment based at least in part on the predicted state of the articulated object.

V: The system of paragraph U, the operations further comprising: applying, by the model, a Kalman filter algorithm to the state data to determine the covariant relationship between the first portion and the second portion, wherein the output by the model is based at least in part on the Kalman filter algorithm.

W: The system of paragraph V, wherein the Kalman filter algorithm is a derivative free Kalman filter algorithm.

X: The system of any of paragraphs U-W, wherein the state data is associated with at least one of the first portion or the second portion and comprises one or more of: position data, orientation data, heading data, velocity data, speed data, acceleration data, yaw data, yaw rate data, distance data indicating a distance from an edge of the first portion or the second portion to an intersection point between the first portion and the second portion, or turning rate data associated with the articulated object.

Y: The system of any of paragraphs U-X, wherein: the first portion is a front portion of the articulated object relative to a direction of travel, the second portion is a rear portion of the articulated object relative to the direction of travel, the predicted state includes position data, yaw data, or velocity data, and the output from the model identifies a covariance between a first point in the first portion and a second point in the second portion.

Z: A method comprising: detecting an articulated object in an environment, the articulated object including a first portion and a second portion; inputting state data associated with the first portion of the articulated object into a model that defines a relationship between the first portion and the second portion of the articulated object; receiving, as an output from the model and based at least in part on the relationship, a predicted state of the second portion of the articulated object at a future time; and controlling a vehicle in the environment based at least in part on predicted state of the articulated object.

AA: The method of paragraph Z, further comprising: applying, by the model, a filtering algorithm to the state data to determine the relationship between the first portion and the second portion, wherein the output by the model is based at least in part on the filtering algorithm.

AB: The method of paragraph AA, wherein the filtering algorithm is an derivative free Kalman filter algorithm.

AC: The method of any of paragraphs Z-AB, wherein the state data is associated with at least one of the first portion or the second portion and comprises one or more of: position data, orientation data, heading data, velocity data, speed data, acceleration data, yaw data, yaw rate data, distance data indicating a distance from an edge of the first portion or the second portion to an intersection point between the first portion and the second portion, or turning rate data associated with the articulated object.

AD: The method of any of paragraphs Z-AC, wherein: the first portion is a front portion of the articulated object relative to a direction of travel, the second portion is a rear portion of the articulated object relative to the direction of travel, the predicted state includes position data, yaw data, or velocity data, and the model identifies a covariance between a first point in the first portion and a second point in the second portion.

AE: The method of any of paragraphs Z-AD, further comprising: receiving sensor data from one or more sensors associated with the vehicle in the environment; and updating, based at least in part on the sensor data, the relationship between the first portion and the second portion of the articulated object.

AF: The method of any of paragraphs Z-AE, further comprising: determining an offset value between a first distance, a first velocity, or a first yaw associated with the first portion and a second distance, a second velocity, or a second yaw associated with the second portion of the articulated object, wherein the output from the model identifying the predicted state of the first portion and the second portion is based at least in part on the offset value.

AG: The method of paragraph AF, wherein the relationship comprises a velocity covariance, a yaw covariance, or a distance covariance between the first portion and the second portion.

AH: The method of any of paragraphs Z-AG, further comprising: determining a first velocity of the first portion or a second velocity of the second portion, wherein the output from the model identifying the predicted state of the second portion is based at least in part on the first velocity or the second velocity.

AI: The method of any of paragraphs Z-AH, further comprising: determining a direction of travel of the articulated object; determining, based at least in part on the direction of travel, the first portion or the second portion as a front portion, wherein the output from the model identifying the predicted state of the front portion.

AJ: The method of any of paragraphs Z-AI, further comprising: receiving first sensor data from a first sensor and second sensor data from a second sensor different from the first sensor, the first sensor and the second sensor associated with the vehicle in the environment; and determining a joint point between the first portion and the second portion based at least in part on the first sensor data and the second sensor data, wherein the output from the model identifying the predicted state of the articulated object is based at least in part on the joint point.

AK: One or more non-transitory computer-readable media storing instructions executable by one or more processors, wherein the instructions, when executed, cause the one or more processors to perform operations comprising: detecting an articulated object in an environment, the articulated object including a first portion and a second portion; inputting state data associated with the articulated object into a model; determining, by the model and based at least in part on the state data, a relationship between the first portion and the second portion of the articulated object; receiving, as an output from the model and based at least in part on the relationship, a predicted state of the first portion and the second portion of the articulated object at a future time; and controlling a vehicle in the environment based at least in part on predicted state of the articulated object.

AL: The one or more non-transitory computer-readable media of paragraph AK, the operations further comprising: applying, by the model, a filtering algorithm to the state data to determine the relationship between the first portion and the second portion, wherein the output by the model is based at least in part on the filtering algorithm.

AM: The one or more non-transitory computer-readable media of paragraph AL, wherein the filtering algorithm is an unscented Kalman filter algorithm.

AN: The one or more non-transitory computer-readable media of any of paragraphs AK-AM, wherein the state data is associated with at least one of the first portion or the second portion and comprises one or more of: position data, orientation data, heading data, velocity data, speed data, acceleration data, yaw rate data, or turning rate data associated with the articulated object.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
   receiving sensor data from a sensor associated with a vehicle in an environment;
   determining, based at least in part on the sensor data, a first representation of a first object in the environment and a second representation of a second object in the environment;
   applying, by a model, one or more heuristics to the first representation and to the second representation; and
   joining, by the model and based at least in part on the applying, the first object and the second object as an articulated object, wherein joining the first representation of the first object and the second representation of the second object as the articulated object is further based at least in part on a control policy comprising information identifying a right of way or a rule of an intersection associated with the first object and the second object in the environment.

2. The system of claim 1, wherein:
   the first representation or the second representation includes a top-down representation, and
   the one or more heuristics comprises a size heuristic, a distance heuristic, or a joining point heuristic.

3. The system of claim 1, wherein applying the one or more heuristics to the first representation and the second representation comprises:
determining a first size of the first representation and a second size of the second representation; and
comparing the first size or the second size to a size threshold,
wherein joining the first representation of the first object and the second representation of the second object is further based at least in part on the first size or the second size meeting or exceeding the size threshold.

4. The system of claim 1, wherein applying the one or more heuristics to the first representation and the second representation comprises:
determining a distance between a first point associated with the first representation and a second point of the second representation; and
comparing the distance to a distance threshold,
wherein joining the first representation of the first object and the second representation of the second object is based at least in part on the distance being less than the distance threshold.

5. The system of claim 1, the operations further comprising:
determining a predicted position of the articulated object at a future time; and
controlling the vehicle in the environment relative to the articulated object at least in part by determining a planned trajectory for the vehicle based at least in part on the predicted position of the articulated object.

6. A method comprising:
receiving sensor data from a sensor associated with a vehicle in an environment;
determining, based at least in part on the sensor data, a first representation of a first object in the environment and a second representation of a second object in the environment;
applying, by a model, one or more heuristics to the first representation and the second representation; and
joining, by the model and based at least in part on the applying, the first object and the second object as an articulated object, wherein joining the first representation of the first object and the second representation of the second object as the articulated object is further based at least in part on a control policy comprising information identifying a right of way or a rule of an intersection associated with the first object and the second object in the environment.

7. The method of claim 6, wherein the model is a first model, and further comprising:
determining, by a second model and based at least in part on the sensor data, data comprising a top-down representation of the environment;
inputting the data into the first model; and
controlling the vehicle in the environment relative to the articulated object.

8. The method of claim 6, wherein the one or more heuristics applied by the model comprises one or more of: a physical heuristic, a physics algorithm, or a linear algebra algorithm.

9. The method of claim 6, wherein applying the one or more heuristics to the first representation and the second representation comprises:
determining a first size of the first representation and a second size of the second representation; and
comparing the first size or the second size to a size threshold,
wherein joining the first representation of the first object and the second representation of the second object is based at least in part on the first size or the second size meeting or exceeding the size threshold.

10. The method of claim 6, wherein applying the one or more heuristics to the first representation and the second representation comprises:
determining a distance between a first point of the first representation and a second point of the second representation; and
comparing the distance to a distance threshold,
wherein joining the first representation of the first object and the second representation of the second object is based at least in part on the distance being less than the distance threshold.

11. The method of claim 6, further comprising:
determining a predicted position of the articulated object at a future time; and
determining a planned trajectory for the vehicle based at least in part on the predicted position of the articulated object.

12. The method of claim 6, wherein applying the one or more heuristics to the first representation and the second representation comprises:
performing at least one of:
determining that the first representation and the second representation overlap; or
determining that a first midline of the first representation intersects with a second midline of the second representation,
wherein joining the first representation of the first object and the second representation of the second object is based at least in part on the first representation and the second representation overlapping or the first midline and the second midline intersecting.

13. The method of claim 6, wherein the joining is associated with a first time, the method further comprising:
receiving additional sensor data from the sensor at a second time after the first time;
applying, by the model, the one or more heuristics to the first representation and the second representation of the articulated object at the second time; and
disjoining the first object from the second object.

14. The method of claim 6, wherein:
the first representation of the first object is a first shape having a first boundary,
the second representation of the second object is a second shape having a second boundary, and
the first shape or the second shape includes two dimensions or three-dimensions.

15. The method of claim 6, further comprising:
determining a first object type of the first object and a second object type of the second object, the first object type or the second object type including at least one of: a car, a truck, a trailer, or a boat; and
comparing, as a comparison, the first object type and the second object type,
wherein joining the first representation of the first object and the second representation of the second object as the articulated object is further based at least in part on the comparison.

16. One or more non transitory computer readable media storing instructions executable by one or more processors, wherein the instructions, when executed, cause the one or more processors to perform operations comprising:
receiving sensor data from a sensor associated with a vehicle in an environment;

determining, based at least in part on the sensor data, a first representation of a first object in the environment and a second representation of a second object in the environment;

applying, by a model, one or more heuristics to the first representation and the second representation;

determining a first object type of the first object and a second object type of the second object;

comparing, as a comparison, the first object type and the second object type; and joining, by the model and based at least in part on the applying and the comparison, the first representation of the first object and the second representation of the second object as an articulated object.

17. The one or more non transitory computer readable media of claim 16, wherein the one or more heuristics applied by the model comprises one or more of: a physical heuristic, a physics algorithm, or a linear algebra algorithm.

18. The one or more non transitory computer readable media of claim 16, wherein applying the one or more heuristics to the first representation and the second representation comprises:

determining a first size of the first representation and a second size of the second representation; and comparing the first size or the second size to a size threshold, wherein joining the first representation of the first object and the second representation of the second object is based at least in part on the first size or the second size meeting or exceeding the size threshold.

19. The one or more non transitory computer readable media of claim 16, wherein applying the one or more heuristics to the first representation and the second representation comprises:

determining a distance between a first point of the first representation and a second point of the second representation; and comparing the distance to a distance threshold, wherein joining the first representation of the first object and the second representation of the second object is based at least in part on the distance being less than the distance threshold.

20. The one or more non transitory computer readable media of claim 16, wherein joining the first representation of the first object and the second representation of the second object as the articulated object is further based at least in part on a control policy comprising information identifying a right of way or a rule of an intersection associated with the first object and the second object in the environment.

* * * * *